US006439634B1

(12) United States Patent
Jensen et al.

(10) Patent No.: US 6,439,634 B1
(45) Date of Patent: Aug. 27, 2002

(54) CLOSURE SYSTEM FOR AUTOMOTIVE SIDE STOWAGE SYSTEM

(75) Inventors: Thomas Charles Jensen, Clarkston; David K. Rock, Washington; Leon S. Kayser, West Bloomfield; James L. Turner, Clinton Township; Ricardo F. Ibanes, Rochester Hills, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/812,342

(22) Filed: Mar. 21, 2001

(51) Int. Cl.[7] .............................. B60R 7/02; B60R 9/02

(52) U.S. Cl. ..................... 296/39.6; 296/37.1; 224/402; 224/403

(58) Field of Search ............................... 296/37.6, 37.1, 296/37.5, 37.16, 1.1; 224/402, 403, 404

(56) References Cited

U.S. PATENT DOCUMENTS

| | | | | | |
|---|---|---|---|---|---|
| 5,567,000 | A | | 10/1996 | Clare | |
| 5,784,769 | A | * | 7/1998 | Clare | 296/37.6 |
| 5,819,390 | A | * | 10/1998 | Clare | 296/37.6 |
| 5,823,598 | A | * | 10/1998 | Clare et al. | 296/37.6 |
| 6,012,754 | A | * | 1/2000 | Clare et al. | 296/37.6 |
| 6,030,018 | A | * | 2/2000 | Clare et al. | 296/37.6 |
| 6,059,341 | A | | 5/2000 | Jenson et al. | |
| 6,129,401 | A | * | 10/2000 | Neag et al. | 296/37.6 |
| 6,142,549 | A | * | 11/2000 | Clare et al. | 296/37.6 |
| 6,237,211 | B1 | * | 5/2001 | Clare et al. | 29/434 |

* cited by examiner

*Primary Examiner*—Stephen T. Gordon
*Assistant Examiner*—Greg Blankenship
(74) *Attorney, Agent, or Firm*—Laura C. Hargitt

(57) ABSTRACT

An external automotive side stowage system including primary and secondary latching devices.

10 Claims, 9 Drawing Sheets

CLOSURE SYSTEM FOR AUTOMOTIVE SIDE STOWAGE SYSTEM

TECHNICAL FIELD

The present invention relates generally to stowage systems for automotive vehicles and more particularly to closure mechanisms for vehicle side stowage systems.

BACKGROUND OF THE INVENTION

In the original equipment automotive vehicle industry, it is desirable for vehicles to incorporate ergonomically satisfying features that are convenient for the vehicle operator and passengers, and are readily manufactured and assembled. In this regard, in recent years, there has been a growing demand for vehicles having large stowage capacities for hauling personal and other effects. The demand has become particularly acute in the truck, light truck, minivan, stationwagon and other sport utility sectors, where competition has grown rapidly, which in turn has fostered the need for developing improved customer convenience features.

As manufacturers continue to engineer improved stowage systems within the vehicle, attention also has been given to reviving prior designs that incorporated stowage compartments into vehicle fenders or side panels. (See, e.g., U.S. Pat. No. 4,135,761) An example of one such revival is disclosed in commonly owned U.S. Pat. No. 6,059,341 (Jensen et al), the teachings of which are hereby incorporated by reference herein for all purposes. Other examples of substantially different systems include the systems of U.S. Pat. Nos. 5,567,000; 5,784,769;5,819,390 (all to Clare); and 5,823,598 (Clare et al), incorporated by reference.

Accordingly, the present invention is directed to meeting the needs of an original equipment automotive vehicle as set forth in the above discussion.

SUMMARY OF THE INVENTION

The present invention is premised upon the development of a unique and improved system for the closure and securing of automotive vehicle side stowage compartments. In one embodiment, for a vehicle side stowage system that includes a storage compartment defined about a vehicle wheel well, and having a door that includes a vehicle body side panel, the improved system generally includes a primary latching system, an optional secondary latching system, and an actuator for remotely operating the primary latching system. The actuator includes at least one manually operated handle (preferably located at or adjacent the vehicle rear or endgate) and an electromagnetic actuator.

BRIEF DESCRIPTION OF THE DRAWINGS

The present invention will hereinafter be described in conjunction with the appended drawing figures, wherein like numerals denote like elements, and.

DESCRIPTION OF THE PREFERRED EMBODIMENT

The following detailed description of a preferred exemplary embodiment of the invention is mainly exemplary in nature and is not intended to limit the invention or its applications or uses.

Figure 1:
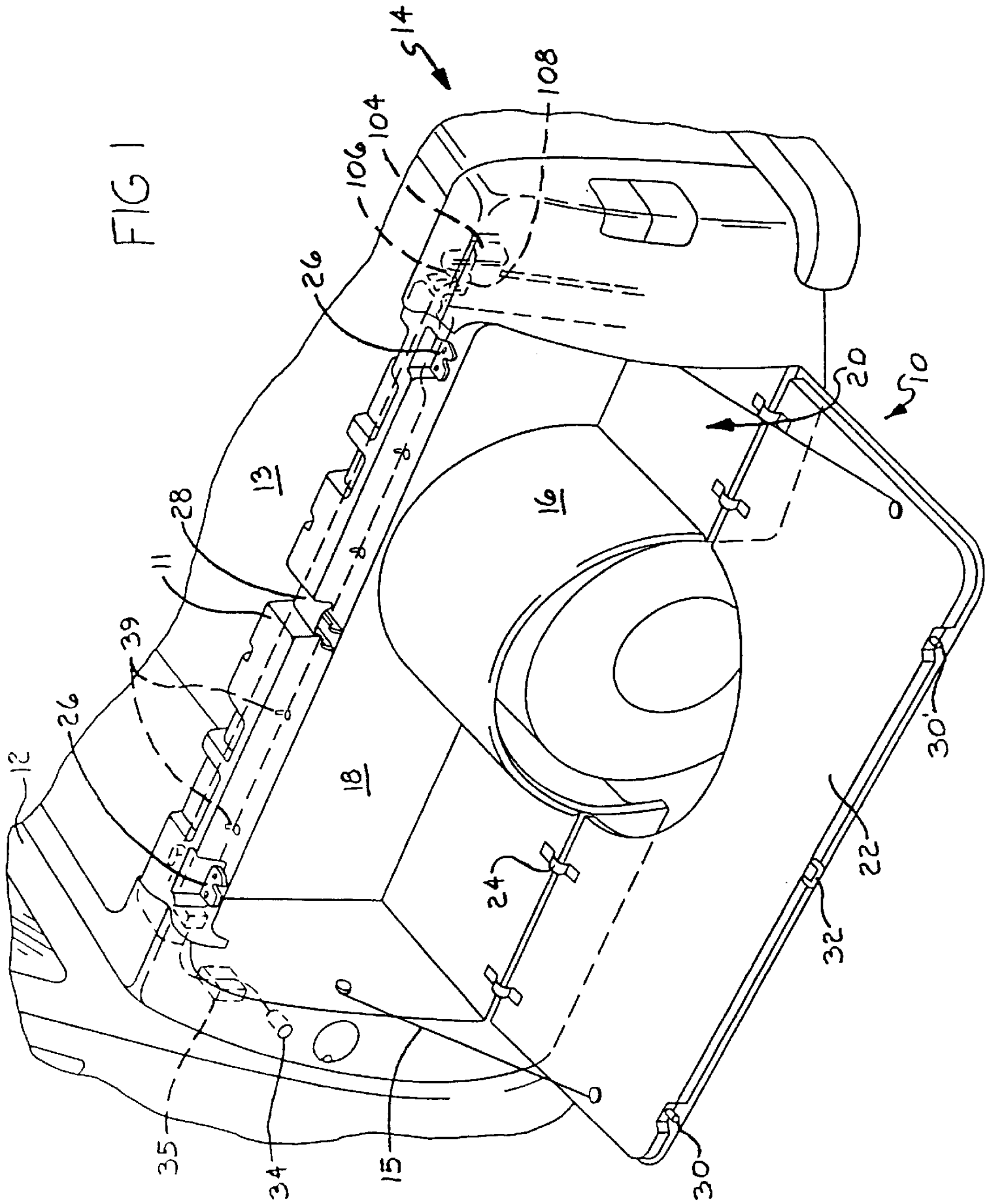
FIG. 1 is a perspective of the preferred embodiment integrated within an automotive vehicle body.

Referring to the Drawings, FIG. 1 shows a side stowage assembly 10 for an automotive vehicle, and particularly a pick up truck having a cab 12 and cargo box 13 (preferably a composite cargo box) assembled on a common chassis suspended on wheels. The cargo box 13 has an endgate 14 and body panels configured as a wheel well 16, and interior walls 18, about which is defined a storage compartment 20. A quarter side panel 22 is operable to conceal and reveal the storage compartment 20. Preferably, a similar configuration is provided on the opposite side of the cargo box. The bottom of the panel 22 is connected to the cargo box by a plurality of hinges 24, with cables for suspending the panel in a substantially horizontal position when open.

The structure defining the storage compartment 20 includes a primary latch system including a first primary latch 26 and optionally a second primary latch 26'. A secondary latch 28 also is included. In one embodiment, it is contemplated that trunk type latches may be employed such as depicted in U.S. Pat. Nos. 4,998,758 and 5,233,849 (both incorporated by reference). The primary latch system also includes a first primary striker 30 and a second primary striker 30' for mating with their respective primary latches. The strikers are adapted so that when mated with a catch of the latch in the panel's closed position, the panel 22 is retained in the closed position. When the latch members are rotated, the strikers are released and the panel may be opened. A secondary striker 32 likewise is employed for mating with the secondary latch.

In one embodiment, the panel 22 may be mounted in like manner as in U.S. Pat. No. 6,059,341. Thus, the hinges 24 may be located sufficiently outboard and the center of gravity of the panel 22 is such that when latches are released, the weight of the panel 22 does not cause it to drop, but rather panel 22 advantageously may remain substantially vertical until the top of the panel 22 is manually pulled away from the storage compartment upper 11 of the cargo box 13.

The endgate 14 and the panel 22 are lockable in a suitable manner, such as is in accordance with the teachings of commonly assigned U.S. patent application Ser. No. 09/066,498 (filed Apr. 24, 1998), hereby incorporated by reference. In one preferred embodiment, the endgate 14 employs a common locking mechanism with the panel 22. A key cylinder 34 is mounted in the fore portion of the cargo box, and optionally in or adjacent the fuel filler area. The key cylinder 34 is associated with an enclosed electric switch 35 (e.g. a single or double pull double throw momentary flip switch) and a suitable cable linkage 38 or wiring (depicted schematically in phantom) for locking and unlocking the primary latches. For electrical locking and unlocking, a suitable power source associated with the key cylinder drives a solenoid, motor, or other actuator to enable operation. It will be appreciated that in view of the electrically operated components, suitable ground straps may be included and associated with the key cylinder, such as at a zinc-shaft or steel pawl. Optionally, a mechanical cable may be used, in a manner known in the art. The key cylinder, having a vertically oriented keyslot, may be visible when the panel 22 is closed, or it may be concealed by a suitable panel or door, such as a fuel filler door. In another embodiment, the locking system is incorporated into the vehicle door locking system. It is thus contemplated that a single key could be used to operate key cylinders for the ignition, side doors, endgate 14, and panel 22. In one embodiment, a preferred key cylinder is a seven-tumbler cylinder having a vertically oriented slot, a plurality (e.g. 2) of formed or spring loaded snap in prongs and a bottom drainage slot.

Figure 2:
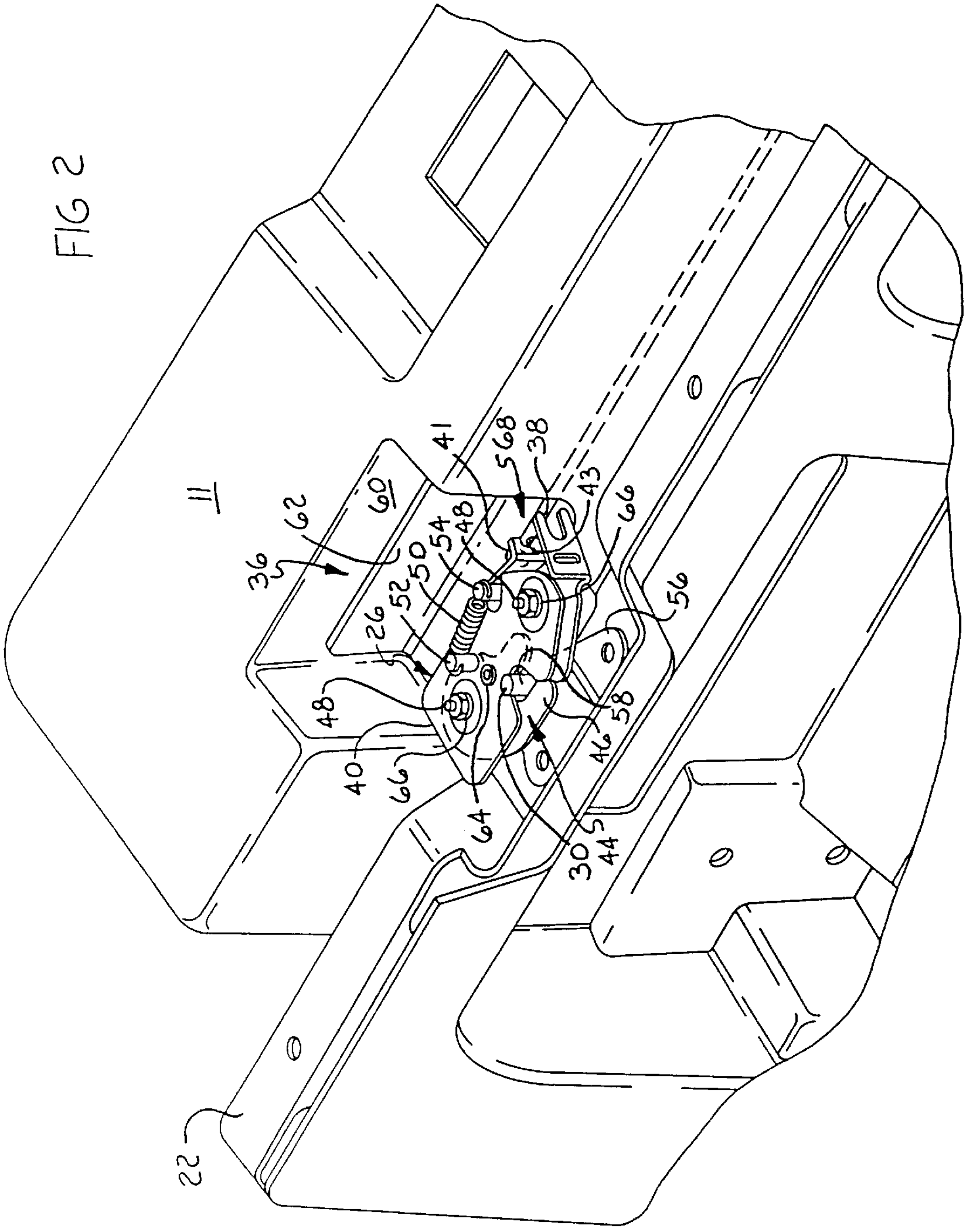
FIG. 2 is a partially broken away perspective of the first primary latch assembly.

The structure of a preferred primary latch mechanism 26 is shown in greater detail in FIG. 2, where there is depicted storage compartment upper 11 defining a cavity 36 for receiving a primary latch 26 (26'). The primary latch is secured to a wall 60 in the storage compartment upper 11. A cable (e.g. a galvanized steel wire rope having a layer of liner material with a reinforcement mesh and a coated conduit) or other suitable linkage 38(38') (fastened to the stowage compartment upper 11, above the seal of the storage compartment, by spaced clips 39 (e.g. spaced about 500–600 mm apart) pre-assembled to the cables) operatively connects the rearward pivotal pawl 108 (mechanized by either the actuator arm 112 or the lever pawl 106) to the forward (and rearward) primary latches 26(26') through the interference of the cable plug ends 41 (e.g. hexagonal or rectangular ends) and restrictive openings 43. However, the location of the latch is not restricted to the wall 60, in another preferred embodiment the latch may be attached to the panel door 22 with the striker being fastened to the storage compartment upper 11. In yet another preferred embodiment, the retaining clips may be affixed to the stowage compartment upper 11 through engagement holes, and optionally with adhesive tape for achieving a desired orientation (e.g. horizontal). The primary latch 26 includes a first fixed frame 40 having a cutout 42 therein. A translatable catch member 44 having an associated latch pawl 46 is pivotally mounted with mounting bolt 48 and bushing 66 to the frame member for pivoting into and out of the cutout 42 and mating with a corresponding striker. A biasing spring 50 connects a first post 52 that projects from the catch member 44 with a second post 54 mounted on the bracket 62 for biasing the catch member to its closed position.

The first primary striker 30 includes a base 56 for mounting the striker to the panel 22 and a striker post 58 that projects from the base, and may be press-fitted to the base. The frame of the first primary latch 26 is mounted abuttingly to the wall 60 by a suitable bracket 62, which may optionally be integrated with the frame 40. In the embodiment of FIG. 2, mounting bolts 48 are used for securing the frame 40 to the bracket 62. The mounting bolt bushing 66 optionally has an associated bushing 64 or spacer for separating plates of the frame 40. Shown in FIG. 2 are walls projecting from at least one of the plates, which have guide slots 68 defined therein for receiving cable 38. In on embodiment, the cable runs above the rear primary latch 26', below the secondary latch and back up to restrictive opening 43.

Figure 3:
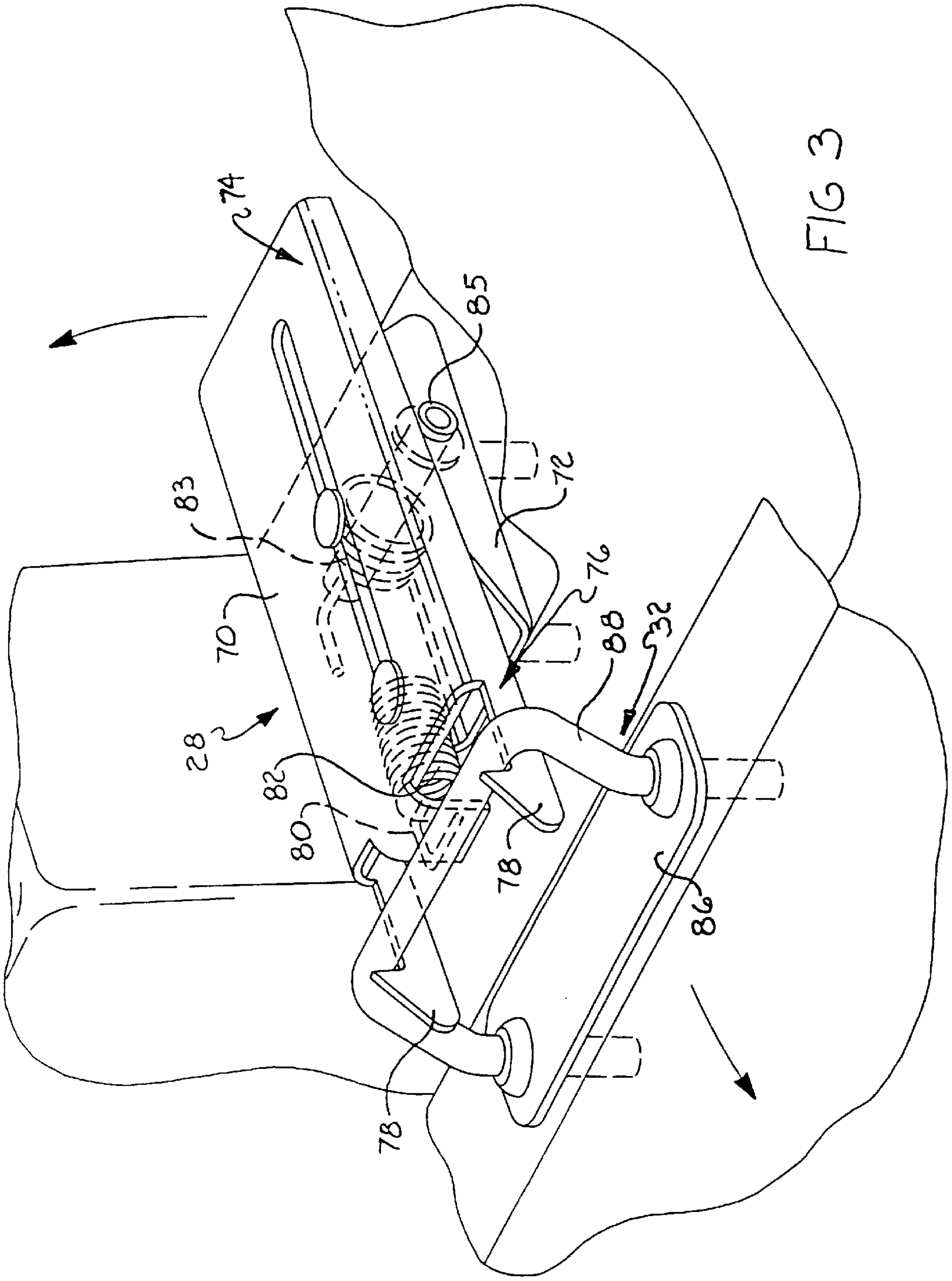
FIG. 3 is a partially broken away perspective of the secondary latch assembly.

FIG. 3 depicts an illustrative example of a secondary latch 28 in accordance with the present invention. The latch 28 includes a lever 70 pivotally mounted to a mounting bracket 72, the latter being securable to the storage compartment upper 11 of the vehicle. The lever 70 has a first end portion 74 for providing an operator with an optional grip surface, and a second end portion 76 having at least one pawl 78 and a flange deflector 80. A spring 82 biases the lever for latching. Thus, pawls 78 are configured for engaging the secondary striker 32, the latter being mounted to the vehicle side panel 22 at a striker base 86 and having an outwardly projecting striker member 88. The location of the latch is not restricted to the storage compartment upper 11, in another preferred embodiment the latch may be attached to the panel door 22 with the striker being fastened to storage compartment upper 11. The lever 70 and associated pawls 78 can be brought into and out of engagement with the secondary striker by gripping the lever at the first end portion 74 and rotating it about the mounting bracket 72, or by depressing the flange deflector 80 to cause such rotation.

Figure 4:
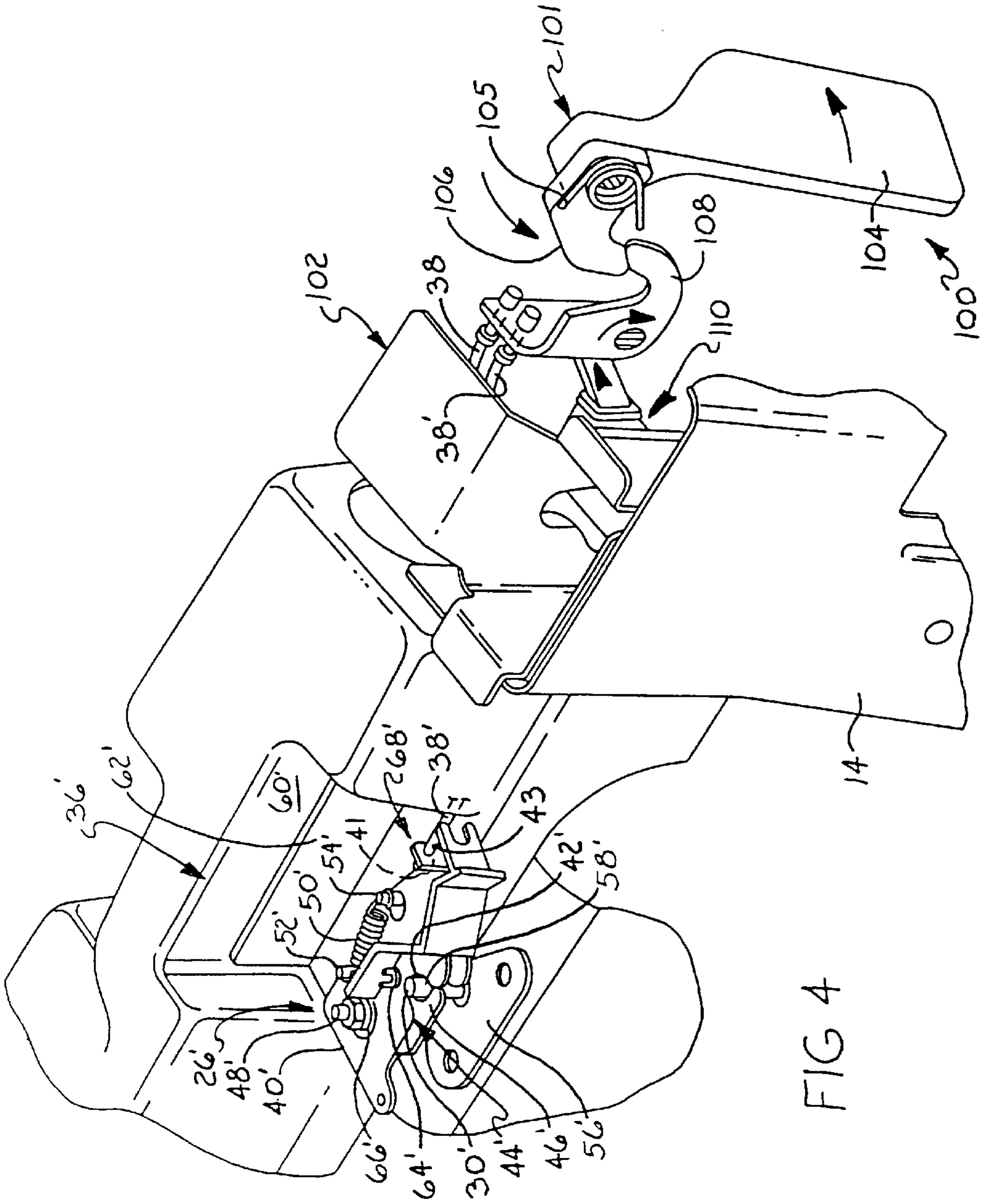
FIG. 4 is a partially broken away perspective of the second primary latch assembly.

FIG. 4 illustrates a second primary latch 26', configured in like manner as the first primary latch but with structural modifications to take into account its functional requirements in view of its location and available space. Though the first primary latch 26 and the second primary latch 26' are shown in FIG. 1, it should be appreciated that more than one of each type may be used in addition to or to the exclusion of the other type. Accordingly, the second primary latch 26' is secured to the wall 36' and a cable or other suitable linkage 38' operatively connects the latch (e.g., by connection to a catch) with an actuator for opening and closing the latch. The primary latch includes a first fixed frame 40' having a cutout 42' therein. A translatable catch member 44' having an associated latch pawl 46' is pivotally mounted with mounting bolt 48' and bushing 66' to the frame member 40' for pivoting into and out of the cutout 42' and mating with a corresponding striker. A biasing spring 50' connects a first post 52' that projects from the catch member 44' with a second post 54' mounted on the bracket 62 for biasing the catch member to its closed position.

The second primary striker 30' includes a base 56' for mounting the striker to the panel 22 and a striker post 58' that projects from the base. The frame of the second primary latch 26' is mounted abuttingly to a wall 60' about the cavity 36' of the cargo box by a suitable bracket 62', which may optionally be integrated with the frame 40'. The mounting bolt bushing 66' optionally has an associated bushing 64' or spacer for separating plates of the frame 40'. Shown in FIG. 4 are walls projecting from at least one of the plates, which have guide slots 68' defined therein for receiving the cable 38'.

Referring to FIGS. 1, 4–8, there is shown a latch release lever mounting bracket 102. The bracket 102 is secured to a latch release lever arm 104 associated with the lever 101, which is pivotally connected to the vehicle adjacent the endgate of the vehicle. Associated with the first end portion of the lever 101 is a lever pawl 106, which is in opposing engaging relationship with a pivotal pawl 108. The pivotal pawl 108 is also in driving relationship with an actuator 110 at the actuator arm 112. The actuator includes an electrical connector portion 114 associated with a housing 116 for a solenoid or other suitable device for driving the actuator arm 112 in response to an electrical signal. As more fully appreciated by reference to FIGS. 5 and 6 in relation to one another, the pivotal pawl also includes a connection to the cables 38 and 38' for manually translating the cables, in response to rotation of the lever arm about its pivot axis (as depicted generally in FIG. 6), defined by the longitudinal axis of a securing fastener 118 (e.g., the shoulder screw shown in FIG. 8). As will also be appreciated, with reference to FIG. 7, the actuator may function independent of the lever arm for driving the pivotal pawl 108 and thereby translating the cables.

Figure 8:
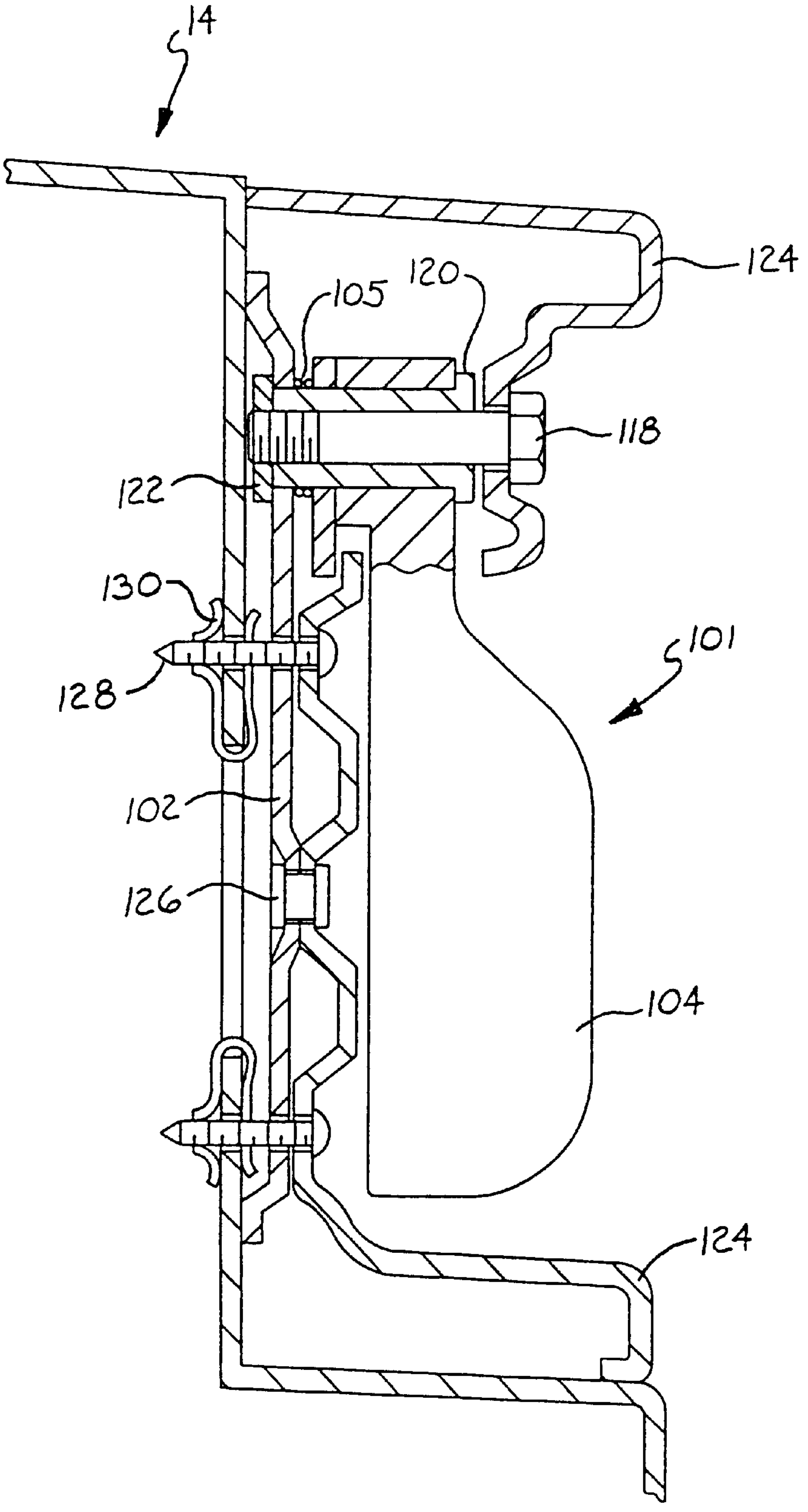
FIG. 8 is a cross-sectional view of the rear handle and actuator cable assembly.

FIG. 8 provides a more detailed view of the construction of a lever assembly for readily installing the assembly into a vehicle and securing it to a wall of the vehicle, such as a wall adjacent the endgate 14. The lever 101 is pivotally secured to the bracket 102 using the fastener 118. In the illustrative embodiment of FIG. 8, the fastener has a threaded portion which is inserted through a bushing 120 of the lever, and is threadably connected to the bushing at a threaded end portion 122 associated with the bushing. A bezel 124, which may be an injection molded plastic such as Xenoy 1760 (as well as the lever arm 104), is provided for partially surrounding the lever. The bezel preferably has a top portion that is or otherwise sealed (water tight) and a bottom portion with an opening to allow for drainage. The bezel 124 is connected to a plastic, metal or composite bracket 102, with a suitable fastener such as a rivet bushing 126 or in another preferred embodiment, a counter-sink shoulder bolt and nylon bushing. The entire assembly, in turn, is secured to the vehicle body with one or more of an adhesive or a suitable fastening system, such as shown in FIG. 8 including a screw 128 threaded through a J-nut. The latter configuration facilitates installation in body panels having cutout portions.

Figure 9:
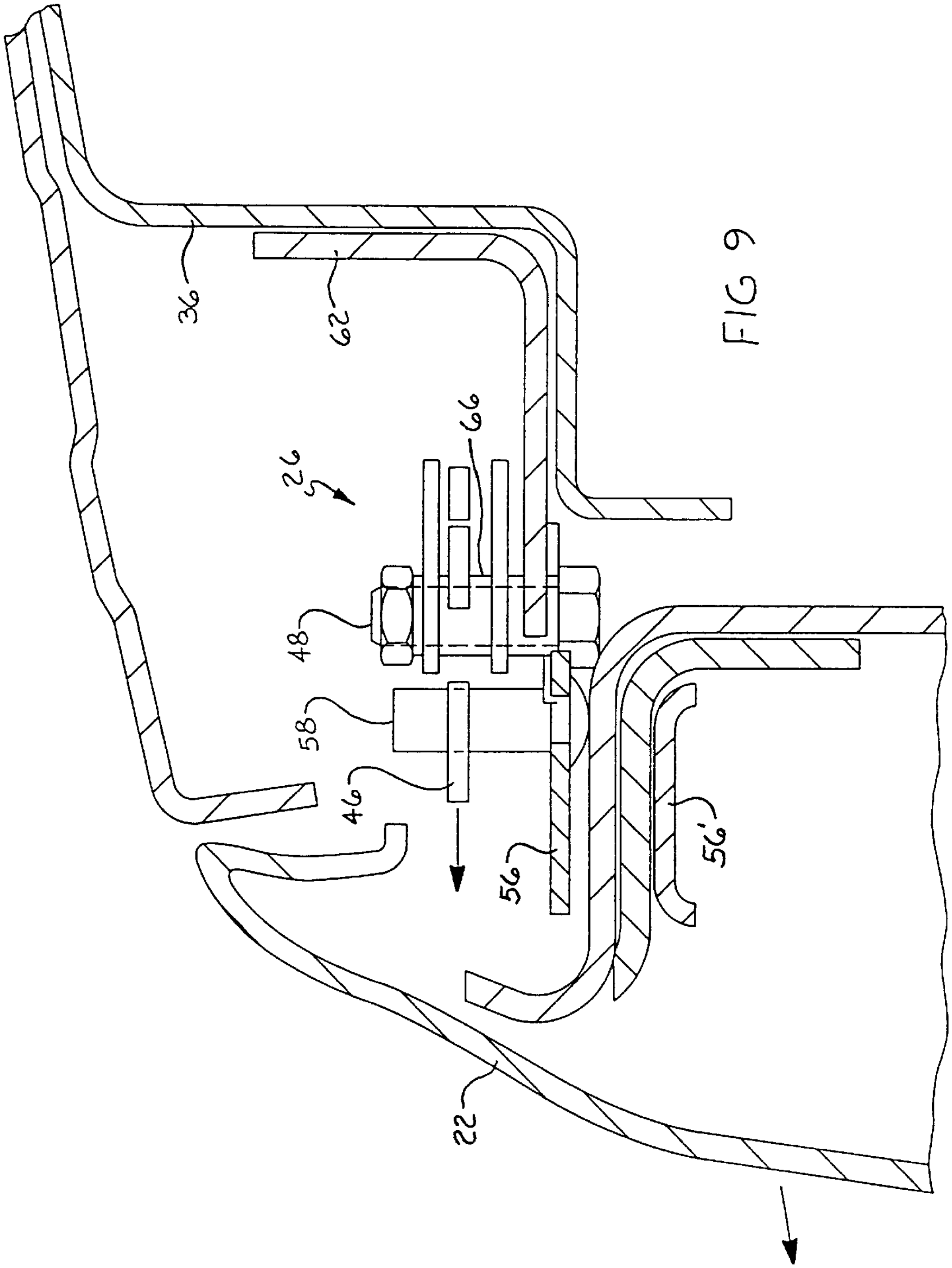
FIG. 9 is a cross-sectional view of a primary latch assembly.

FIG. 9 shows generally the panel 22 in its closed position in the region containing the primary latch 26. The bracket 62 of the latch is mounted to the wall 36 of the vehicle cargo box. The striker components are mounted to an inner surface of the panel 22. In its closed position, it will be appreciated that the latch and striker components (including latch pawl 46, striker base 56 and post 58) do not substantially affect the vehicle's exterior appearance, nor does it require modification to the contour of the surface of the panel 22. Also depicted in FIG. 9 is an optional reinforcement plate structure 56' (including one or more flanges) for securing the striker plate 56 to the panel 22.

Figure 5:
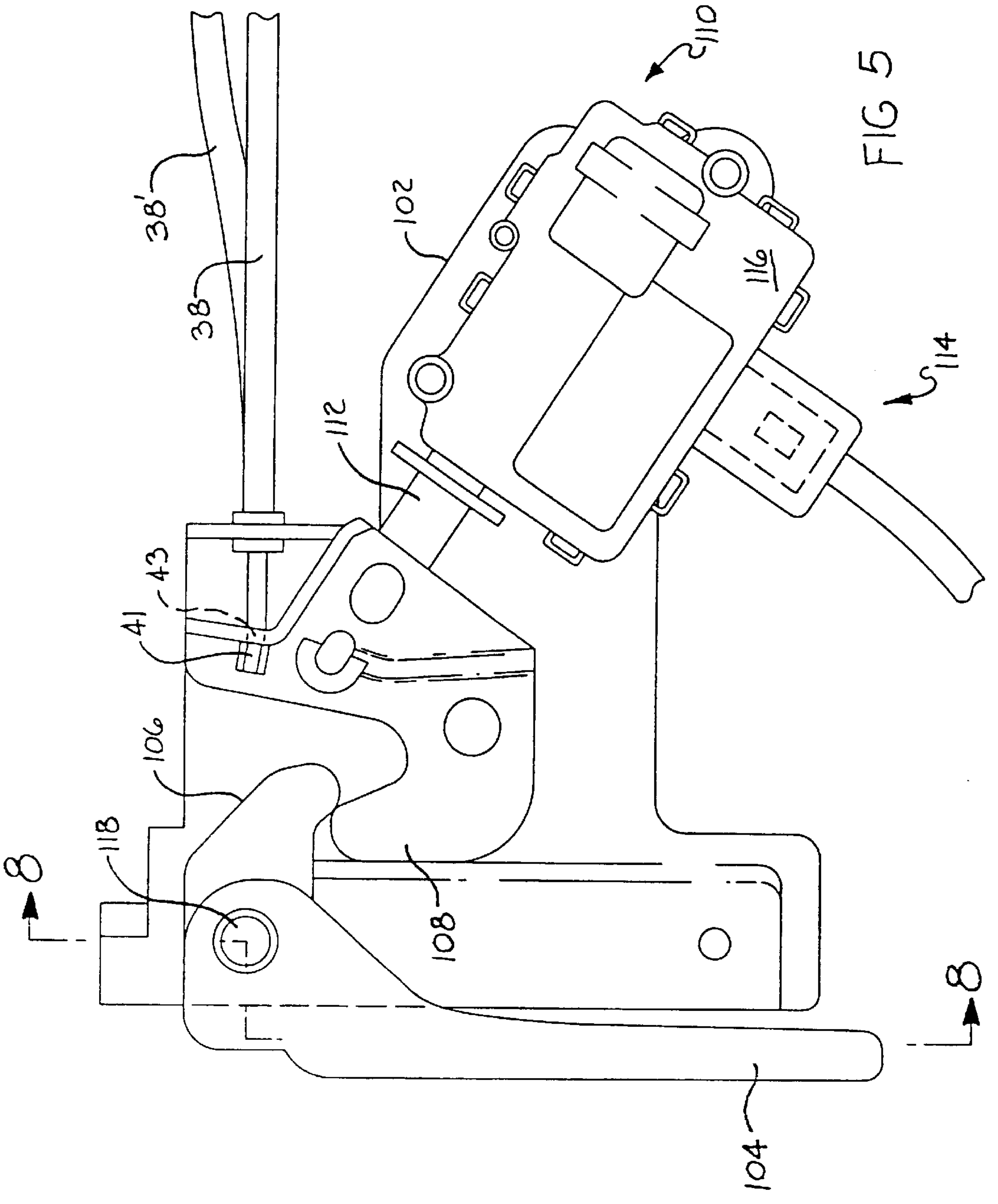
FIG. 5 illustrates a side view of the rear handle and actuator assembly in the closed position.
Figure 6:
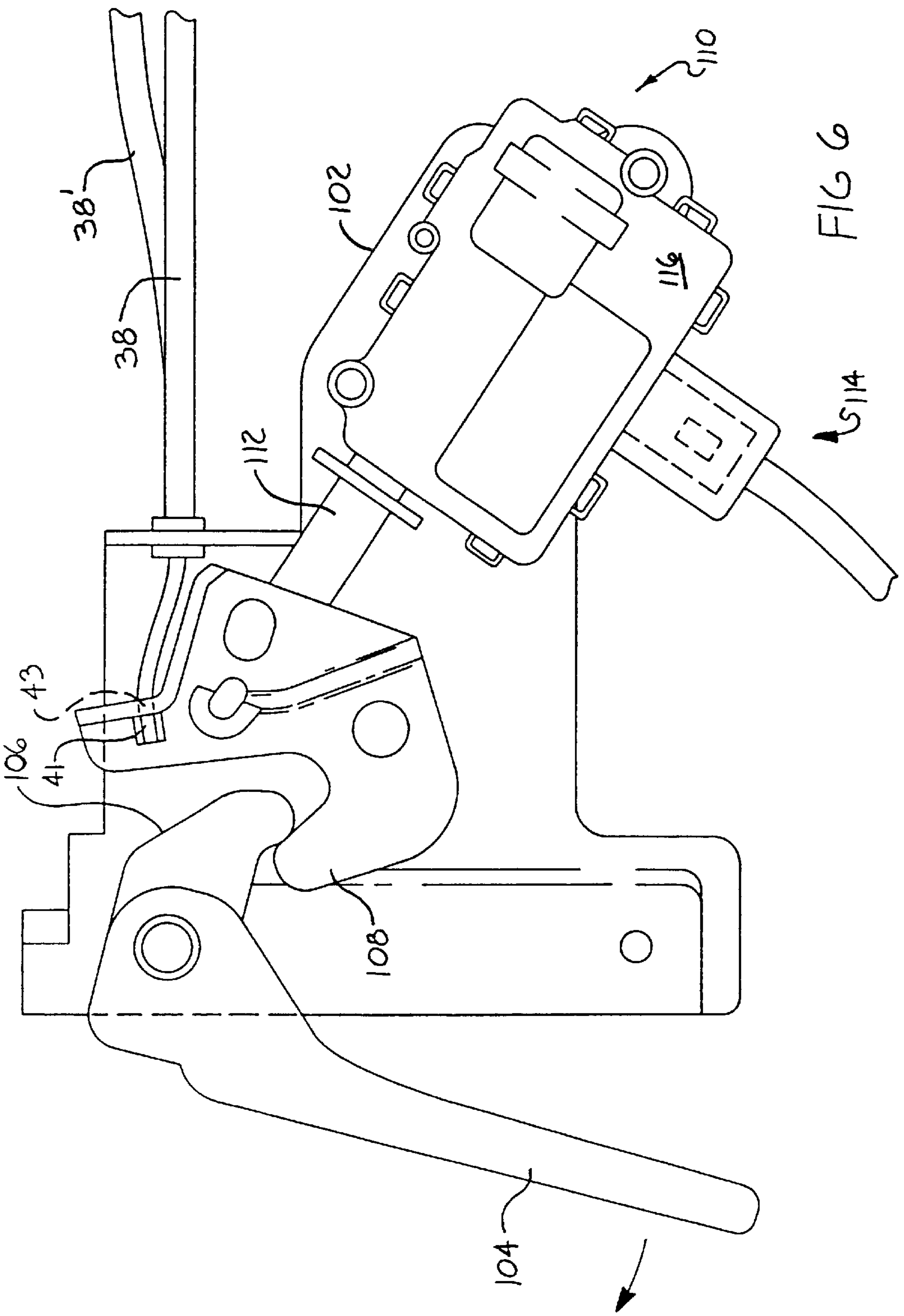
FIG. 6 illustrates a side view of the rear handle and actuator assembly in the released position.
Figure 7:
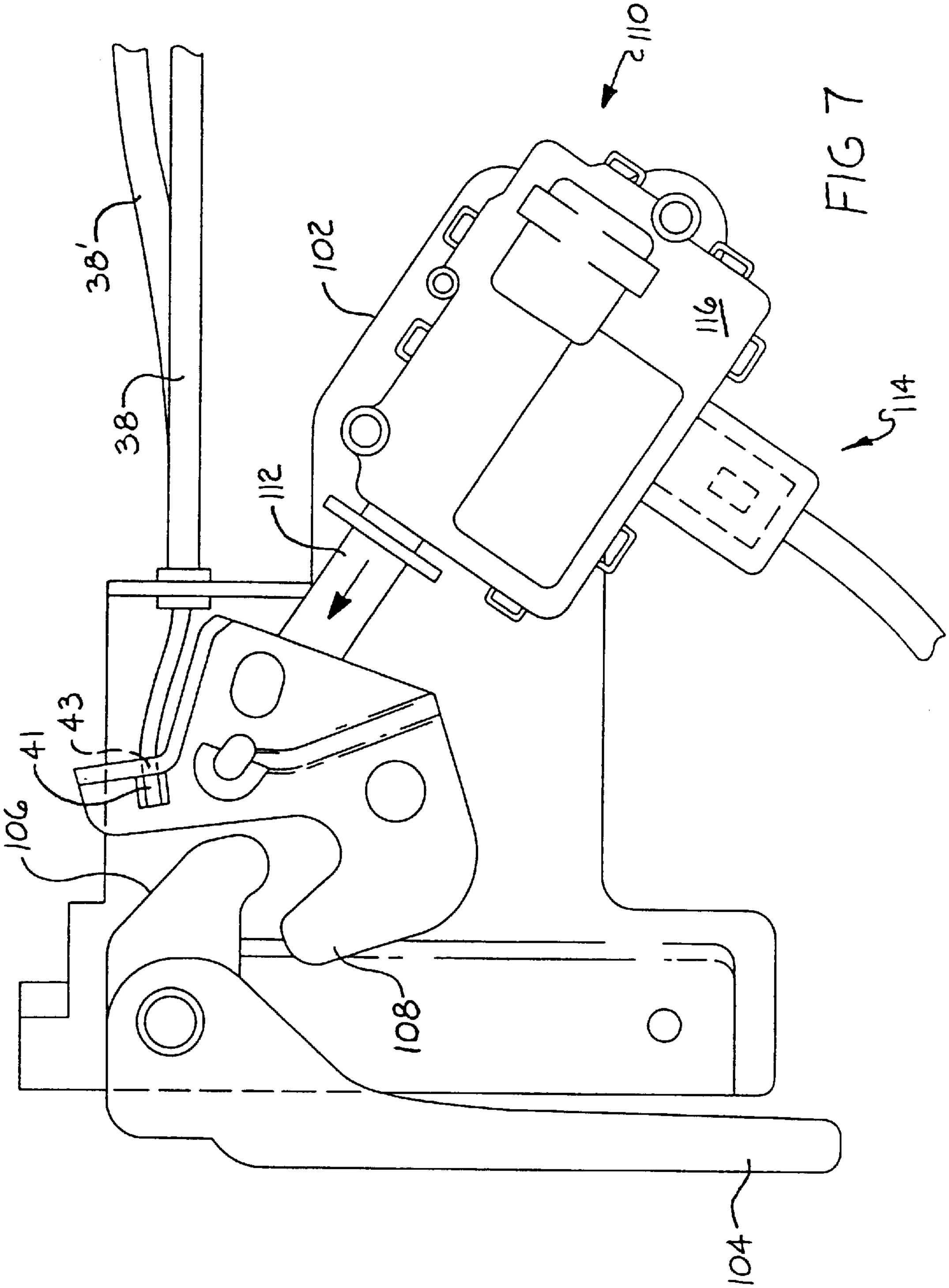
FIG. 7 illustrates another side view of the rear handle and actuator assembly in the released position.

The side stowage compartment assembly may be operated using either the manual lever arm assembly 100 or the key initiated electric actuator 110. Without limitations, FIGS. 5–7 illustrate the dynamic relationship of the releasing components (the lever or actuator assemblies) and the latch and striker assembly by using either of the methods.

The manual lever arm assembly is accessible by, but not reliant upon, lowering endgate 14, thus exposing the lever arm 104 completely. Upon pulling lever arm 104, a rotational force is created about shoulder screw 118, which simultaneously pivots the associated lever pawl 106 in turn rotating pivotal pawl 108 and pulling the suitable linkage 38(38') releasing the primary strikers 30 and 30'from their respective latches.

Without intending to be limited thereby, in one preferred embodiment, the travel of lever arm 104 to unlatch the side stowage compartment 10 from the primary latches 26(26') is limited to about 45°. Additionally, for that embodiment the maximum pre-travel allowed before engaging the latch is about 10°, the maximum over-travel allowed after activating the latch is about 5° and the minimum over-travel allowed after activating the latch is about 2°.

In one preferred embodiment the assembly is configured such that the force required to initiate the latch release mechanisms through lever arm 104 does not exceed about 40 Newtons, and more preferably 35 Newtons. Upon releasing the lever arm 104, it is returned to its original position through biasing lever arm spring 105.

Likewise, a suitable key or remote (e.g. radio frequency) actuating system may also be used to rotate the pivotal pawl 108 and manipulate the suitable linkage release to free the strikers 30 and 30'from their respective latches using a substantially equivalent force to that of lever arm 104. For instance, once the key solenoid has been rotated thus activating the electrical switch 35 and signaling the actuator, the system may transmit a signal causing the actuator arm 112 to extend, thereby rotating the pivotal pawl. The actuating arm is then retracted to its original position by an internal spring once the power is ceased. Unlike the manual lever arm assembly, where the user must access the cargo box 13 to some extent (typically by lowering the endgate), the key actuating system may initiate the dynamics of the side storage compartment assembly and said components by a simple key rotation, located outside of the vehicle, which may or may not be associated with the rest of the vehicle locking assembly.

In accordance with the above, it will be appreciated that once the pivotal pawl 108 rotates about it's axis and the primary strikers have been released from their respective latches and have moved away from the latch cutouts 42, the secondary striker 32 comes in contact with the secondary latch assembly 28, specifically the latch pawl(s) 78 biased by spring 82 which prevents further opening of the quarter side panel 22. To complete the opening sequence of the door, it is necessary to cause the first end portion 74 of the secondary latch to be lifted or rotated, which is spring biased by spring 83 and pivoted about pin 85, to release the secondary striker from the latch pawls 78 thus allowing the quarter side panel to extend to its lowest position allowed by cables 15. Preferably the first end portion 74 of the secondary latch assembly 28 is located about an opening such that an individual wearing gloves would not encounter problems lifting the portion.

To close the quarter side panel 22, the panel is returned to its original position, in order to allow both the primary and the secondary strikers to re-engage with the primary latch catch 46 (46') and the secondary latch pawls 78 and secure the compartment closed. The above operational discussion is not intended as limiting, as other manners of operation consistent with the foregoing are possible.

It will be appreciated that the present invention is not limited in utility to pick-up trucks. It may be suitably employed in any vehicle having a side stowage compartment, including but not limited to sport utility vehicles, minivans, station wagons, ordinary passenger automobiles, trucks, light trucks, or the like.

The foregoing detailed description provides preferred exemplary embodiments only, and is not intended to limit the scope, applicability, or configuration of the invention in any way. Rather, the ensuing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. A pick-up truck having a side stowage compartment, comprising:

a) a pick-up box having a first side, a second side, a first end and a second end, said first end being mounted adjacent to a passenger compartment on a vehicle frame, b) a door rotatably connected to said pickup box at one of its sides for concealing said stowage compartment when in its closed position;

c) a first latch for releasably securing said side stowage compartment door to said pickup truck including a first striker and a first catch member for releasably engaging said first striker;

d) a second latch for releasably securing said side stowage compartment door to said pickup truck including a second striker and a second catch member for releasably engaging said second striker;

e) a third latch for manually releasing and securing said side stowage compartment to said pickup truck; and f) a latch actuator remotely located relative to said first and second latches for simultaneously releasably engaging and disengaging said first and second latches, said latch actuator being selected from a key cylinder, a lever, an electromagnetic actuator or a combination thereof.

2. The pickup truck of claim 1, wherein at least one of the said catch members are mounted on said pickup truck body and said strikers are mounted on said stowage compartment door.

3. The pickup truck of claim 1, wherein at least one of the said strikers are mounted on said pickup truck body and said catch members are mounted on said stowage compartment door.

4. The pickup truck of claim 1, wherein said latch actuator has a linkage that includes cables for manual actuation.

5. The pickup truck of claim 1, wherein said latch actuator includes a lever pivotally mounted to one of said walls of said pickup box.

6. The pickup truck of claim 1, wherein said latch actuator is pivotally mounted adjacent the endgate of said pickup truck.

7. The pickup truck of claim 4, wherein said linkage includes a first cable attached to said latch actuator for actuating said first latch and a second cable attached to said latch actuator for actuating said second latch, wherein said first latch and said second latch are each actuated substantially simultaneously upon a pivotal rotation of said latch actuator.

8. The vehicle of claim 7, wherein said secondary latch is accessible only after said first and second primary latches are disengaged.

9. The vehicle of claim 8, wherein said secondary latch maintains said door in a substantially closed position when it is securing engagement with said door.

10. The vehicle of claim 8, wherein said secondary latch is capable of only manual operation by a vehicle operator.

* * * * *